US009910589B2

(12) United States Patent
Jia et al.

(10) Patent No.: US 9,910,589 B2
(45) Date of Patent: Mar. 6, 2018

(54) VIRTUAL KEYBOARD WITH ADAPTIVE CHARACTER RECOGNITION ZONES

(71) Applicant: NVIDIA Corporation, Santa Clara, CA (US)

(72) Inventors: Zhen Jia, Shenzhen (CN); Jing Guo, Shenzhen (CN); Lina Yu, Shenzhen (CN); Yuqi Cui, Shenzhen (CN)

(73) Assignee: Nvidia Corporation, Santa Clara, CA (US)

( * ) Notice: Subject to any disclaimer, the term of this patent is extended or adjusted under 35 U.S.C. 154(b) by 144 days.

(21) Appl. No.: 14/528,265

(22) Filed: Oct. 30, 2014

(65) Prior Publication Data

US 2015/0128083 A1 May 7, 2015

(30) Foreign Application Priority Data

Nov. 1, 2013 (CN) .......................... 2013 1 0535473

(51) Int. Cl.
*G06F 3/0488* (2013.01)
*G06F 17/30* (2006.01)
*G06F 3/023* (2006.01)

(52) U.S. Cl.
CPC ........ *G06F 3/04886* (2013.01); *G06F 3/0237* (2013.01); *G06F 17/30687* (2013.01)

(58) Field of Classification Search
CPC ............... G06F 3/04886; G06F 3/0237; G06F 17/30687
See application file for complete search history.

(56) References Cited

U.S. PATENT DOCUMENTS

| 5,995,081 A | 11/1999 | Kato |
| 2002/0188448 A1 | 12/2002 | Goodman et al. |
| 2003/0107607 A1 | 6/2003 | Nguyen |
| 2004/0100457 A1 | 5/2004 | Mandle |
| 2004/0212586 A1 | 10/2004 | Denny, III |
| 2007/0016572 A1 | 1/2007 | Bates et al. |
| 2007/0103455 A1 | 5/2007 | Omata |
| 2007/0242036 A1 | 10/2007 | Wilson et al. |
| 2009/0167727 A1 | 7/2009 | Liu et al. |
| 2009/0262637 A1 | 10/2009 | Badaye et al. |
| 2010/0315266 A1* | 12/2010 | Gunawardana ..... G06F 3/04886 341/22 |
| 2011/0074685 A1* | 3/2011 | Causey ............... G06F 3/04886 345/168 |
| 2011/0074704 A1* | 3/2011 | Causey ................. G06F 3/0237 345/173 |
| 2011/0078613 A1* | 3/2011 | Bangalore .......... G06F 3/04886 715/773 |
| 2011/0261026 A1 | 10/2011 | Kim et al. |
| 2011/0273376 A1 | 11/2011 | Dickinson et al. |
| 2012/0146957 A1 | 6/2012 | Dunagan |
| 2012/0153424 A1 | 6/2012 | Wright et al. |

(Continued)

*Primary Examiner* — Anil Bhargava

(57) ABSTRACT

A virtual keyboard with dynamically adjusted recognition zones for predicted user-intended characters. When a user interaction with the virtual keyboard is received on the virtual keyboard, a character in a recognition zone encompassing the detected interaction location is selected as the current input character. Characters likely to be the next input character are predicted based on the current input character. The recognition zones of the predicted next input characters are adjusted to be larger than their original sizes.

19 Claims, 5 Drawing Sheets

(56) References Cited

U.S. PATENT DOCUMENTS

| | | |
|---|---|---|
| 2012/0223894 A1 | 9/2012 | Zhao et al. |
| 2012/0327041 A1 | 12/2012 | Harley et al. |
| 2013/0044078 A1 | 2/2013 | Hallenberg et al. |
| 2013/0082937 A1 | 4/2013 | Liu et al. |
| 2013/0100071 A1 | 4/2013 | Wright et al. |
| 2013/0135191 A1 | 5/2013 | Shiokawa |
| 2013/0194242 A1 | 8/2013 | Park et al. |
| 2013/0249823 A1 | 9/2013 | Ahn et al. |
| 2014/0028633 A1 | 1/2014 | Mercea et al. |
| 2014/0043245 A1 | 2/2014 | Dowd et al. |
| 2014/0240237 A1* | 8/2014 | Park .................... G06F 3/04886 345/168 |
| 2014/0253464 A1 | 9/2014 | Hicks et al. |
| 2014/0267078 A1 | 9/2014 | Kukulski et al. |
| 2014/0267192 A1 | 9/2014 | Matsuura et al. |
| 2015/0015497 A1 | 1/2015 | Leigh |
| 2015/0029163 A1 | 1/2015 | Harris et al. |

\* cited by examiner

VIRTUAL KEYBOARD WITH ADAPTIVE CHARACTER RECOGNITION ZONES

CROSS-REFERENCE TO RELATED APPLICATIONS

This application claims benefit and priority to Chinese Patent Application No. 201310535473.7, filed on Nov. 1, 2013, which is hereby incorporated by reference in its entirety.

FIELD OF INVENTION

Embodiments of the present invention relate generally to computer user interfaces and more particularly to virtual keyboards.

BACKGROUND

Today, touch screens are widely used in various electronic devices. Users can provide input by interacting with virtual keyboards displayed on the touch screens. Generally virtual keyboards are limited by the size of the associated touch screen. When a user tries to select a character from a virtual keyboard displayed on a relatively small touch screen, misinterpretation of the touch location is likely to occur as the actual touch point often falls outside a recognition zone of the intended character. Such misinterpretations lead to high input error rate, which can lead to user frustration.

SUMMARY OF THE INVENTION

Therefore, it would be advantageous to provide a user interface mechanism offering reduced input error rates and therefore a better user experience.

According to one embodiment of the present invention, a computer implemented method of receiving user input through a graphical user interface (GUI) comprises rendering a GUI with a virtual keyboard for display on a computer device's display device. The virtual keyboard comprises a plurality of characters arranged in a pattern, each character associated with a recognition zone. A user interaction detected within the recognition zone causes the character to be selected as an input character. The method further comprises: receiving a first user interaction with the GUI on a first location with reference to the virtual keyboard; and selecting a first character as a first input character, where the first character is associated with a first recognition zone encompasses the first location. One or more next characters are predicted based on the first input character. Recognitions zones of the one or more next characters are then enlarged while their display zones remain unchanged. Thereby user input accuracy can be advantageously enhanced due to the larger zones.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
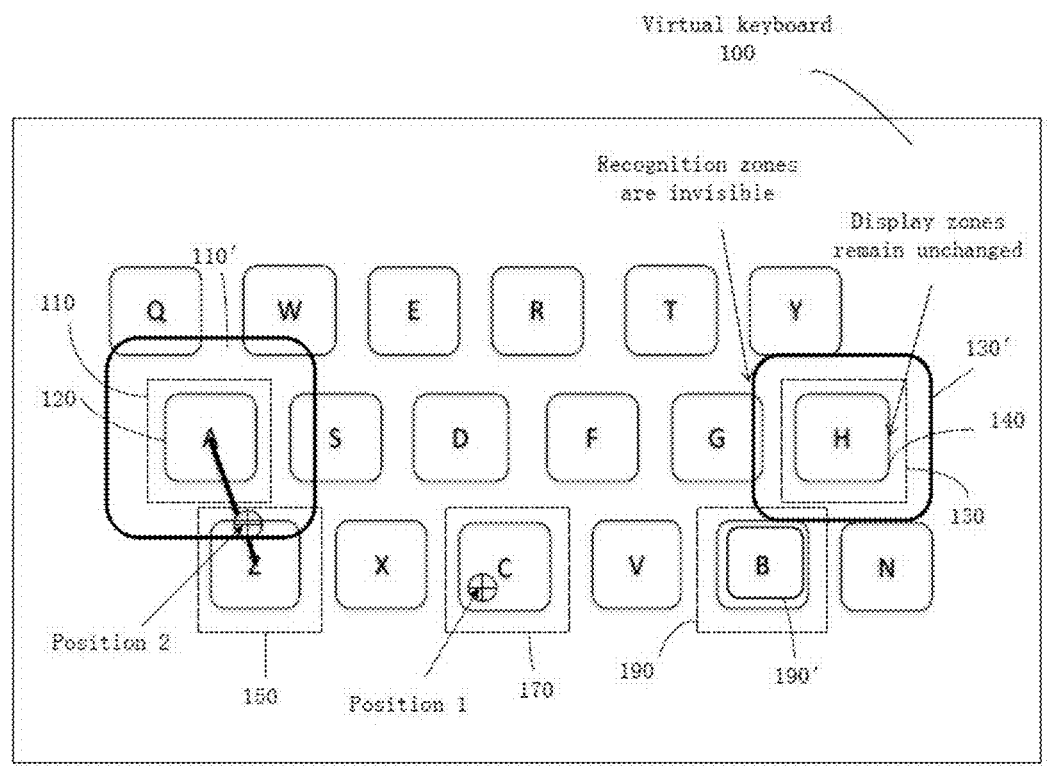
FIG. 1 illustrates a diagram of an exemplary virtual keyboard 100 according to an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Virtual Keyboard with Adaptive Character Recognition Zones

FIG. 1 illustrates a diagram of an exemplary virtual keyboard 100 according to an embodiment of the present disclosure. A number of characters are arranged on the virtual keyboard 100. A recognition zone and a display zone are defined for each character on the virtual keyboard 100. Each character is displayed in its display zone, and is selected (or committed) as an input character once a user touch is detected within its recognition zone. Recognition zones are not explicitly shown on the virtual keyboard 100. In an original state of the virtual keyboard 100, the size of the recognition zone of a character is close to the size of its display zone and is located spatially with the character. As shown in FIG. 1, more specifically, the recognition zone of the character "A" is zone 110; the recognition zone of the character "H" is zone 130; the recognition zone of the character "Z" is zone 150; the recognition zone of the character "C" is zone 170; the recognition zone of the character "B" is zone 190. The display zone of the character "A" is zone 120; and the display zone of the character "H" is zone 140.

According to an embodiment of the present disclosure, one or more characters most likely to be the next input character are predicted according to the user's current character input on the virtual keyboard 100. The recognition zones of the current predicted characters and the last predicted characters, if any, are adjusted based on the prediction. As shown in FIG. 1, for example, the recognition zone of each character is in its original size when virtual keyboard 100 is in an original state. In some embodiments, the original sizes of the recognition zones may vary among the characters. For example, the original recognition zone of the character "Space" is larger than the original recognition zones of other characters.

According to an embodiment of the present disclosure, after the character "C" is committed as an input, it is predicted that the next user-intended character is most likely to be the character "A" or "H" based on a query to a database, and the possibility for the character "A" is greater than the character "H". The recognition zones of the current predicted characters (here "A" and "H") and the last predicted characters, if any, are adjusted according to this prediction result. In this example, according to the prediction result, the recognition zone of the character "A" is adjusted and becomes zone 110'; the recognition zone of the character "H" is adjusted and becomes zone 130'; and the recognition zone of the character "B" which is the last predicted character is adjusted and becomes zone 190'. As shown in FIG. 1, the recognition zones of the characters "A" and "H" are enlarged, while the recognition zone of the character "B" is diminished. The recognition zones of other characters such as the characters "C" and "Z" remain original. Moreover, the display zones of all characters remain unchanged.

According to the above example, the adjusted recognition zone 110' is larger than the original recognition zone 110 as a result of the predicting and adjusting processes. If the prediction is correct and that the next user-intended character is the character "A", even though the user touch point (here "position 2") falls outside the recognition zone 110, the character "A" is selected as input because the touch point is within the enlarged recognition zone 110' which is larger than zone 110. Thus, by predicting the user-intended next characters and accordingly adjusting the recognition zones thereof on the virtual keyboard, the errors caused by touch point deviations can be advantageously reduced. In an embodiment of the present disclosure, the recognition zones of the characters are adjusted without adjustment on their display zones. As a result, the input accuracy is advantageously improved without any change in the virtual keyboard visualization to a user.

It will be appreciated that characters in the present disclosure can be any type of characters included in a virtual keyboard layout that are well known in the art, such as alphabetic characters, punctuations, numeric characters, "Space", "Enter", "Backspace" and the like. The virtual keyboard 100 according to an embodiment of the present disclosure is illustrative only, and it will be appreciated that the disclosure is not limited to such embodiment.

Figure 2:
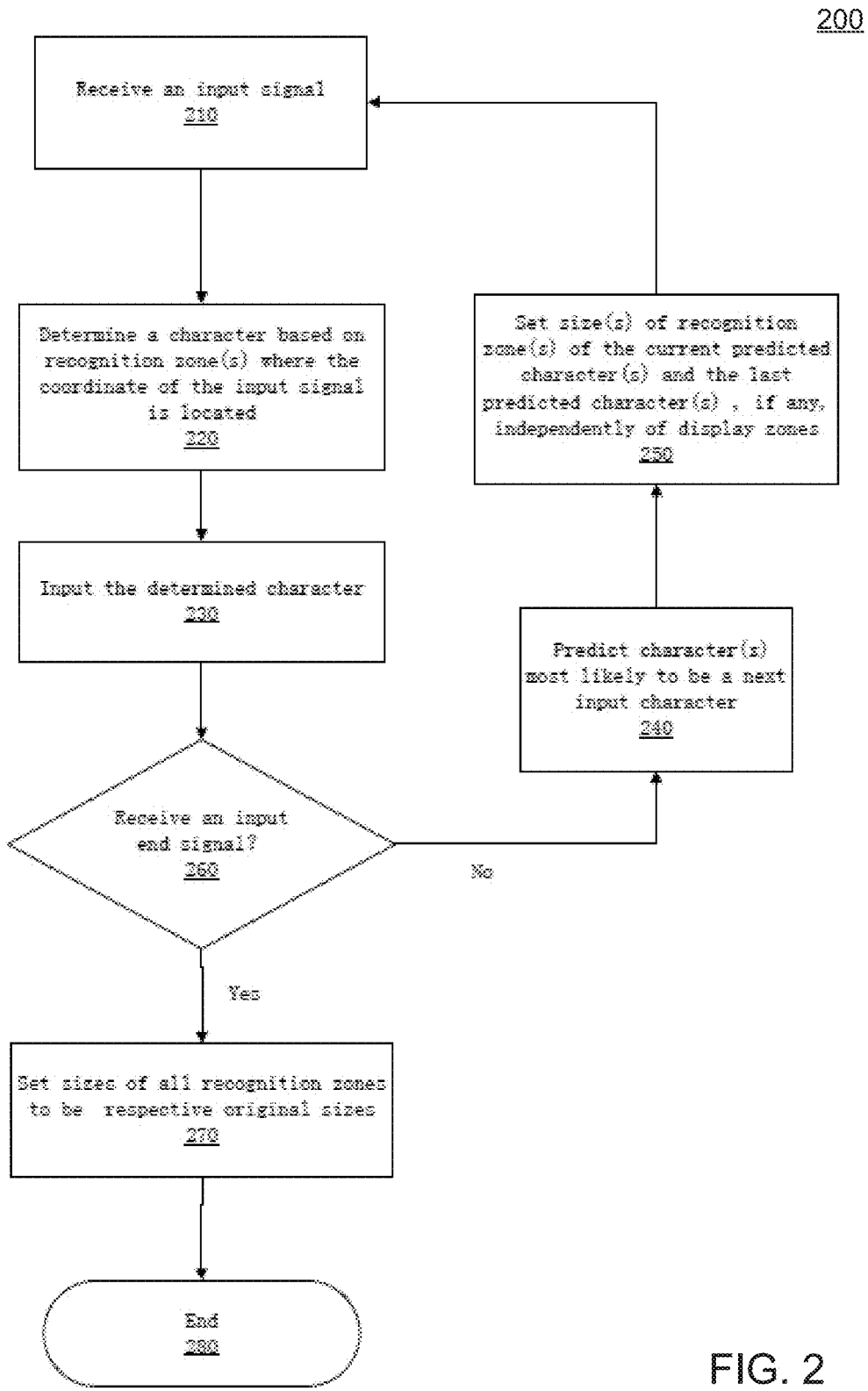
FIG. 2 illustrates a flow chart of an exemplary computer implemented method 200 of determining a user input via a virtual keyboard according to an embodiment of the present disclosure.

According to one aspect of the present disclosure, a computer implemented method of determining a user input by interaction with a virtual keyboard is disclosed. FIG. 2 illustrates a flow chart of an exemplary computer implemented method 200 of determining a user input via a virtual keyboard according to an embodiment of the present disclosure.

At 210, a user interaction with the virtual keyboard 100 is detected. An input signal is produced when a user touches (e.g., clicks or taps) the virtual keyboard 100 displayed on the touch screen. The input signal indicates a coordinate (X, Y) of the user touch location on the virtual keyboard 100.

At 220, a character is selected based on a recognition zone encompassing the coordinate (X, Y). Generally, the recognition zones of characters may be defined by coordinate ranges on the virtual keyboard 100. When the coordinate (X, Y) of the detected touch location is located in a recognition zone of a single character, the character is selected directly according the coordinate range encompassing the coordinate (X, Y). As shown in FIG. 1, for example, the coordinate (X, Y) of position 1 is located in the recognition zone 170 of the character "C." Thus, a touch location at position one causes the character "C" to be selected as the user input.

According to an embodiment of the present disclosure, a touch location may be located in an overlap zone where recognition zones of multiple characters overlap each other. As shown in FIG. 1, the position 2 falls in both the recognition zone of "A" 110' and the recognition zone of "Z" 150. An exemplary method of selecting a character based on detected touch location in an overlap zone will be described in detailed referring to FIG. 3 and FIG. 4 below.

After the character is selected based on the detected touch location, the character is committed as an input at 230, e.g., typed on the touch screen. In example, the character "C" is typed at 230 responsive to a user touch detected at position 1.

At 240, one or more characters most likely to be the next input character are automatically predicted according to the current actual input character. According to an embodiment of the present disclosure, the characters most likely to be the next input character may be predicted based on a query to a memory resident database including dictionary data, grammar data, association rule data and the like. The association rule data in the database may be dynamic, e.g., updated regularly according to a user's input habit, for example once a week or a month. Also, the database may be updated according to the changes of contents stored a computing device where the virtual keyboard is implemented. The database update can increase the accuracy in predictions and thereby enhance the user experience.

According to the example described with reference to 230, the current input character is the character "C." In the context of typing English, character "A" is used most frequently immediately following the character "C" according to the dictionary data and association rule data, and the character "H" is the second. Thus, in this example, at 240 the predicted next characters are the characters "A" and "H" following the current input character "C."

In one embodiment, in the context of typing in English, when the input character is the character "Space" or "Enter," the predicted next characters are the characters "C" and "S" because words with initials "C" and "S" are the most common. In some embodiments, the characters "Space" and "Enter" are used to indicate that a complete word has just been typed.

According to another embodiment of the present disclosure, there may be no predicted next character when the current input character is the character "Space," "Enter" or "Backspace." A user interaction with the character "Backspace" can be interpreted as the user is correcting an input error. In one embodiment, if the current input character is "Backspace," "Space," or "Enter," all the characters on the virtual keyboard are treated as equally possible to be the next user input, and thus the recognition zones of all characters on the virtual keyboard remain in their original sizes.

In one embodiment, the recognition zones of all the characters on the virtual keyboard automatically restore to their respective original sizes at the beginning of typing a new word.

At step 250, the sizes of the recognition zones of the current predicted characters and the last predicted characters, if any, are adjusted independently of display zones thereof. The adjusted sizes of the recognition zones of the current predicted characters are larger than respective original sizes thereof.

The last predicted characters are the characters which are predicted upon inputting the last character. For example, assuming that the word which the user desires to input is "beautiful," the string "beaut" has been typed with the character "u" being the last input character. At 240, the characters "n" and "i" are predicted once the character "u" is typed. Thus with reference to the current input character "t," the characters "n" and "i" are the last predicted characters. Those skilled in the art will appreciate that a prediction may not be performed under certain circumstances, for example, before the first character of a word is typed.

In one embodiment, there may be no current predicted character associated with certain input characters. For example, when the input character is the character "Backspace," no prediction is performed. In this case, the recognition zones of all the character on the virtual keyboard are in their original sizes after 250.

Thus, the recognition zones of the characters on the virtual keyboard 100 may be selectively enlarged and/or reduced according to a prediction result. For instance, when the word "beautiful" is the user-intended input and the first of the two characters "u" has been input, the recognition zones of the characters "n" and "i" are enlarged from their original sizes. After the character "t" is input, the sizes of the last predicted characters "n" and "i" are reset according to the current input character "t." If the characters most likely to be the next input character, which are predicted according to the character "t" at 240, do not include the characters "n" and "i," the recognition zones of the last predicted characters "n" and "i" are restored to their original sizes. However, if the current predicted characters based on the current input "t" include at least one of the last predicted characters "n" and "i," the included last predicted character becomes a current predicted character.

According to an embodiment of the present disclosure, the recognition zone of a current predicted character becomes larger than its original size and the recognition zones of other characters. According to another embodiment of the present disclosure, the recognition zones of characters adjacent to a current predicted character are accordingly adjusted to a smaller size to avoid overlap with the enlarged recognition zones. Referring to FIG. 1, the recognition zones of the characters "Y," "G," "B" and "N" adjacent to the character "H" may be adjusted to be smaller than respective original sizes. For example, the recognition zone of the character "B" becomes zone 190' which is smaller than zone 190. Thus, the computing method for determining a user-intended character according to an embodiment of the present disclosure can be advantageously simplified due to lack of overlap among recognition zones.

According to an embodiment of the present disclosure, the recognition zones of the predicted characters may be adjusted to the same size. For example, as shown in FIG. 1, the size of the recognition zone 110' of the predicted character "A" is the same as that of the recognition zone 130' of the predicted character "H."

According to another embodiment, when a touch location is located within an overlap zone, the respective recognition zones of the predicted characters may be adjusted to different sizes according to priorities of the predicted characters. Based on the current input, each of the predicted characters is associated with a probability value determined according to a database query result. A priority may be assigned to each predicted character based on its probability of being the next user-intended character. For example, the character with the greater probability has a higher priority. As shown in FIG. 1, the priority of the character "A" is higher than the priority of the character "H." Thus, the size of the recognition zone 110' is set to be larger than that of the recognition zone 130'. Advantageously, the input accuracy can be further improved.

In the embodiments described above, the recognition zones are adjusted independently of the display zones. That is, while the sizes of the recognition zones of the characters are adapted, the display zones of the characters remain unchanged. As shown in FIG. 1, when the recognition zone 110 of the character "A" becomes the zone 110', the size of the display zone 120 of the character "A" remains unchanged. This offers the benefit of not causing any visual difference or distraction to a user due to the recognition zone adjustments. Furthermore, an input method of the present disclosure is easy to implement because the display zones are not involved in the adjustment.

According to an embodiment of the present disclosure, the above computer implemented method further includes 260, 270 and 280.

At 260 of FIG. 2, an input end signal is received. For example, a picture input key may be clicked when the user needs to input a picture during the input process, which generates an input end signal. In response, the input process is ended. A user interaction with any other suitable key (such as return key and the like) may also be used to end the input process.

If the input end signal is received at 260, the method proceeds to 270. At 270, the sizes of all recognition zones are set to be their original sizes. Consequently, when the next input process begins, the recognition zones of all the characters are in their original sizes.

After 270, the method proceeds to 280. At 280, the input process ends or repeats.

Figure 3:
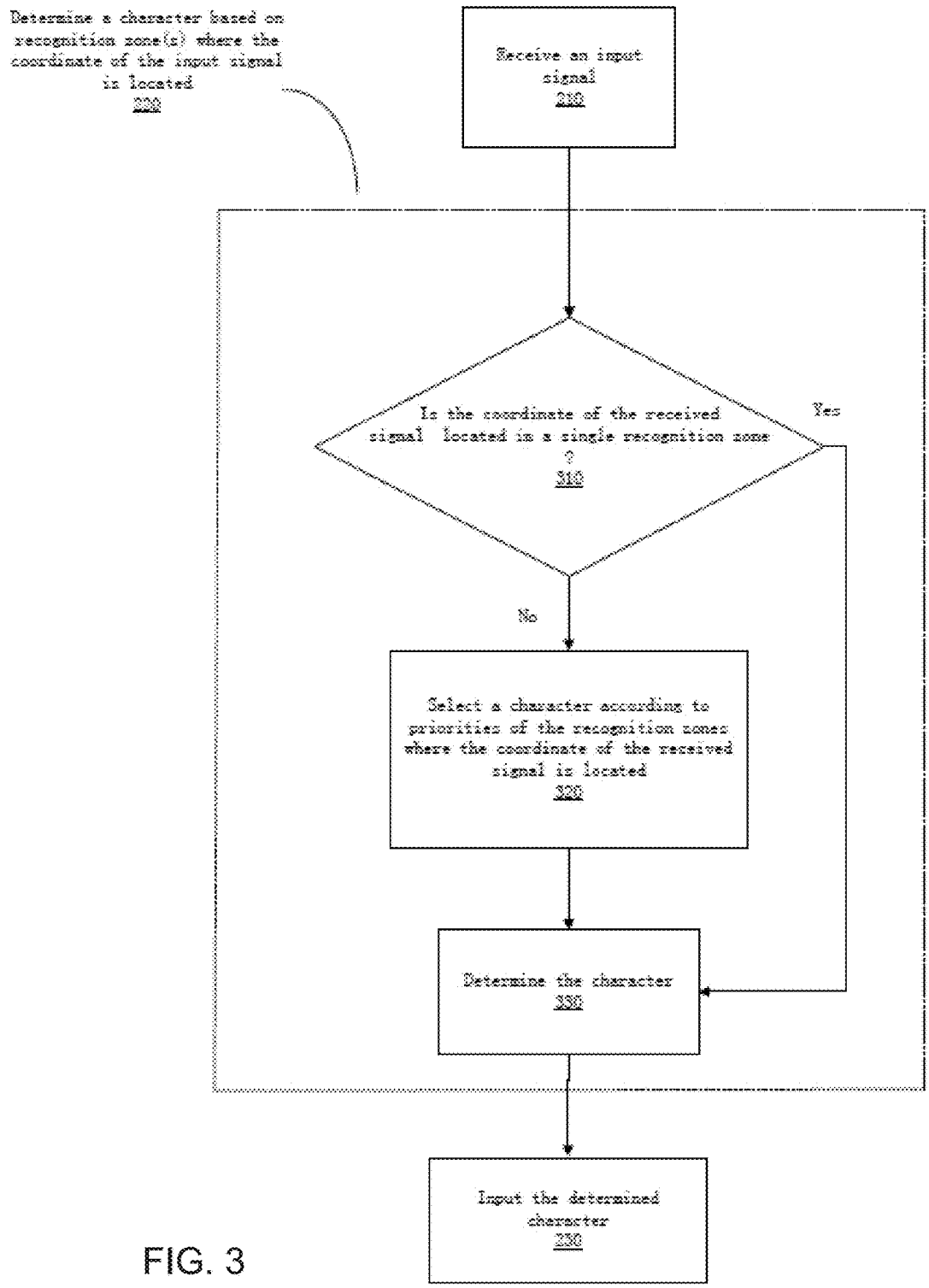
FIG. 3 is a flow chart depicting an exemplary compute implemented method of selecting a character based on detected touch location according to an embodiment of the present disclosure.

An implementation of the above 220 according to an exemplary embodiment of the present disclosure will be described in detailed as follows. FIG. 3 illustrates a flow chart of an exemplary computer implemented method of selecting a character as an input based on recognition zones according to an embodiment of the present disclosure.

At 310, it is decided whether the detected touch location (or the coordinate indicated in a received input signal) is located in a single recognition zone. If it is located in a single recognition zone which has no overlap with any other recognition zone, the method proceeds to 330 where a character in the single recognition zone is selected, as described in detail above.

If the coordinate (X, Y) of the detected touch location is located in an overlap zone of a plurality of recognition zones, at 320, the character is selected according to priorities of characters with their recognition zones encompassing the touch location. The priorities of the predicted characters may be assigned to be higher than other characters. In one embodiment, the predicted characters are prioritized according to the probabilities of being the next user-intended input character. As shown in FIG. 1, the recognition zone 110' of the character "A" has the first priority. The recognition zone 130' of the character "H" has the second priority. The recognition zones of other characters have the third priority. According to an embodiment of the present disclosure, the character may be selected as an input directly according to the priorities of the predicted characters which have their recognition zones encompassing the touch location.

As shown in FIG. 1, for example, the coordinate (X, Y) (shown as position 2) is located in both the recognition zone of the character "A" and the recognition zone of the character "Z." Because the priority of the character "A" is higher than that of the character "Z," the character "A" is selected for input.

According to an embodiment of the present disclosure, the character may be selected according to weights generated based on the coordinate (X, Y) and the priorities. When the coordinate (X, Y) is located in an overlap zone, the position of the coordinate (X, Y) relative to each recognition zone may also be taken into account. So the character for input may be determined more accurately.

For example, the distance from the coordinate (X, Y) to the center of each recognition zone encompassing the coordinate (X, Y) is computed. The reciprocals of the computed distances are computed. The weight of a respective recognition zone is calculated by multiplying the priority with the reciprocal of the distance. In some embodiments,
the weight of the reorganization zone of "A"=(the priority× nonlinear normalization value of the distance); and
the weight of the recognition zone of "Z"=(the priority× nonlinear normalization value of the distance), and thus
the random number between 0 and 1 is generated to select "A" or "Z."

As shown in FIG. 1, when the coordinate (X, Y) is at position 2, the distance from the coordinate (X, Y) to the center of the recognition zone of the character "A" is 3.5, and the distance from the coordinate (X, Y) to the center of the recognition zone of the character "Z" is 1.5. The priority of the character "A" is assigned to be 2 and the priority of the character "Z" is assigned to be 1. Thus it is determined by computation that the weight of the recognition zone 110' of the character "A" is 0.57, and the weight of the recognition zone 150 of the character "Z" is 0.67. As a result, the character "Z" is committed as an input due its higher weight.

In some embodiments, the process of selecting the character according to weights generated based on the coordinate (X, Y) and the priorities further includes the following steps. The distance from the coordinate (X, Y) to the center of each recognition zone encompassing the coordinate (X, Y) is computed respectively. Nonlinear normalization values of the distances are computed. The weights are generated based on the nonlinear normalization values of the distances and the priorities. The character is then selected based on the weights.

Nonlinear normalization values of the distances may be computed using the equation: nonlinear normalization values of the distance=SQRT ((total distance-distance)/total distance), wherein "SQRT" represents a square root calculation. The "distance" represents the distance from the coordinate (X, Y) to the center of a recognition zone along a straight line. The "total distance" represents the linear distance from the center of one recognition zone to the boundary of the recognition zone crossing the coordinate (X, Y). In some other embodiments, the nonlinear normalization values of the distances may be computed by performing any other nonlinear normalization computing method, such as a power calculation with an exponent power less than 1.

Again referring to FIG. 1, for example, when the coordinate (X, Y) is at position 2, the distance from the coordinate (X, Y) to the center of the recognition zone 110' of the character "A" is 3.5, and the distance from the coordinate (X, Y) to the center of the recognition zone 150 of the character "Z" is 1.5. The total distance from the center of the recognition zone 110' to the boundary of the recognition zone 110' is 4, and the total distance from the center of the recognition zone 150 to the boundary of the recognition zone 150 is 2. It is determined by computation with the above equation that the nonlinear normalization values of the distances 3.5 and 1.5 are 0.35 and 0.5, respectively. The weights are generated with the nonlinear normalization values of the distances and the priorities. According to an embodiment, the weights of the recognition zones are achieved by multiplying the priorities with the nonlinear normalization values of the distances. In the example, the priority of "A" is 2, and the priority "Z" the recognition zone 150 is 1. Thus, it is determined by computation that the weight of the recognition zone 110' is 0.7, and the weight of the recognition zone 150 is 0.5. The character "A" is selected for input directly due to its higher weight.

Figure 4:
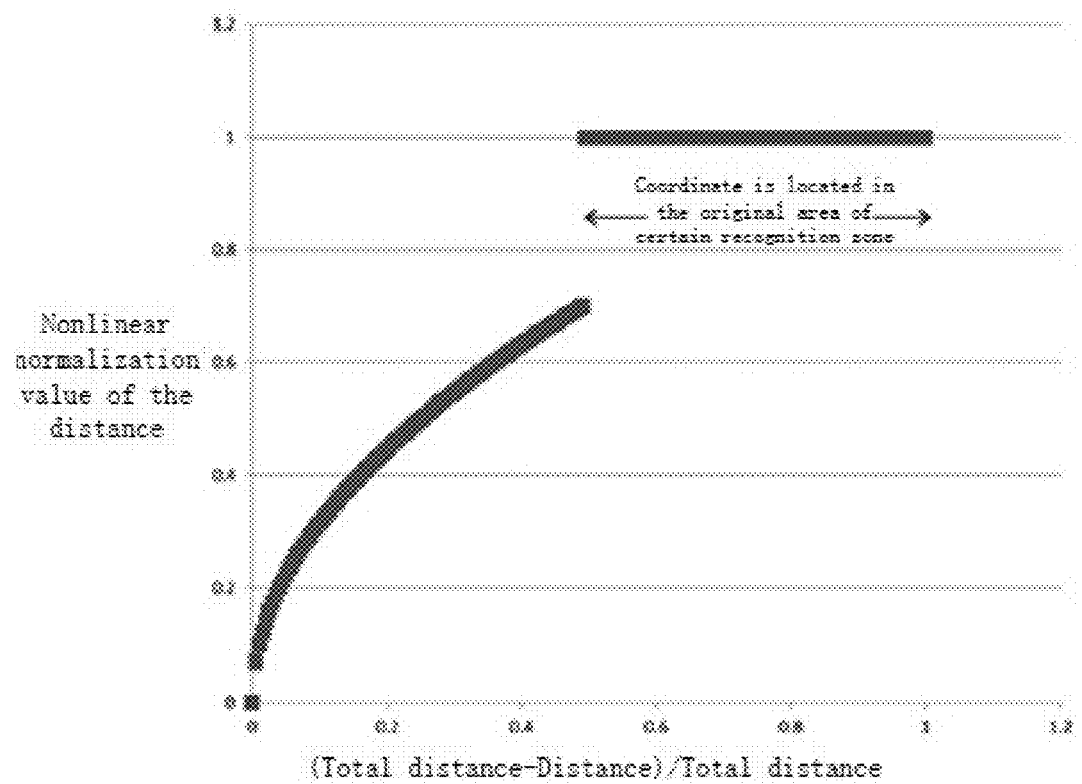
FIG. 4 is a sample data plot showing a variation trend of nonlinear normalization value with the distance between a touch location and the center of a recognition zone according to an embodiment of the present disclosure.

As show in FIG. 4, the closer the coordinate (X, Y) to the boundary of the recognition zone, the faster the nonlinear normalization value of the distance is attenuated. The closer the coordinate (X, Y) to the center of the recognition zone, the slower the nonlinear normalization value of the distance is attenuated. By computing the nonlinear normalization values of the distances, the sizes of the recognition zones as well as the distances from the coordinate (X, Y) to the boundaries are taken into account to select a character. Consequently, the input accuracy can be further improved.

When the coordinate (X, Y) is located in the original area of a certain recognition zone, it may be not necessary to compute the nonlinear normalization value of the distance associated with this recognition zone. As shown in FIG. 4, the nonlinear normalization value of the distance associated with this recognition zone is set to be 1 by default. For example, when the coordinate (X, Y) is at position 2, the coordinate (X, Y) is located in the original recognition zone 150 of the character "Z." Thus, the nonlinear normalization value of the distance associated with the recognition zone 150 is set to be 1. Then the weight may be derived by multiplying the priority with the nonlinear normalization value of the distance. In this example, the priority of "Z" is 1. Thus, the weight of the recognition zone 150 is 1.

It should be appreciated that the disclosure should not be construed as limited by the above computing methods for the weights, and the above embodiments are just for purposes of explanation and illustration.

According to an embodiment of the present disclosure, the process of selecting an input character according to the weights further includes the following. Probability values for choosing the recognition zones where the coordinate (X, Y) is located are computed according to the weights. The character is selected according to the probability values. The probability values associated with the recognition zones may be computed based on the weights to select the character. For example, the weight of the recognition zone 110' of the character "A" is 1.3 and the weight of the recognition zone 150 of the character "Z" is 0.76. The normalized values of the two weights are computed. The probability value for choosing the recognition zones 110' of the character "A" is computed to be 63% and the probability value for choosing the recognition zone 150 of the character "Z" is computed to be 37%. A random number between 0 and 1 is generated by a random generator. When the random number falls into the range from 0 to 0.63, the character "A" is chosen. When the random number falls into the range from 0.63 to 1 or is equal to 0.63, the character "Z" is chosen. The input error rate may be further reduced by choosing the character according to the probability values.

At 330, the character may be selected based on the single recognition zone encompassing the detected touch location. If the touch location falls in an overlap zone, a character is selected according to priorities or weights of the recognition zones commonly encompassing the touch location.

Figure 5:
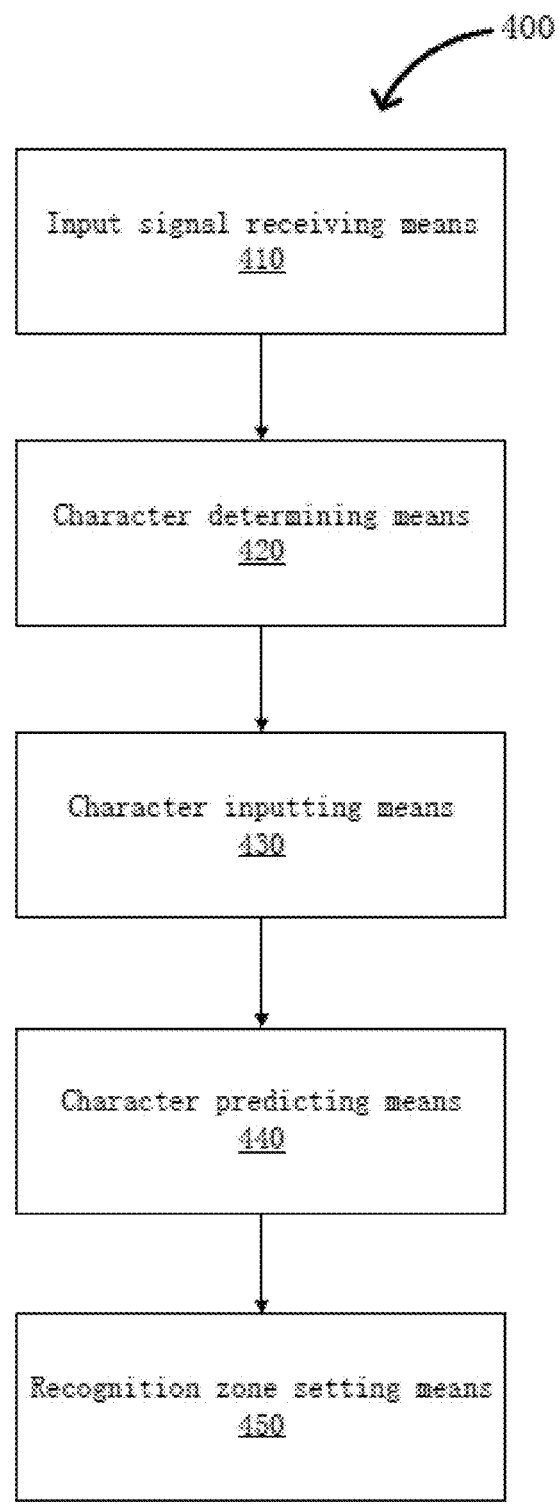
FIG. 5 illustrates an exemplary computer implemented input system for a virtual keyboard according to an embodiment of the present disclosure.

According to another aspect of the present disclosure, an input system for a virtual keyboard is disclosed. FIG. 5 illustrates a diagram of an exemplary computer implemented input system 400 including a virtual keyboard according to an embodiment of the present disclosure. For instance, the system 400 is implemented as a virtual keyboard software resident on memory of a computer and executable by a processor of the computer. A user can interact with the system 400 via a touchscreen associated with the computer.

The input system 400 is computer implemented and includes an input signal receiving means 410, a character determining means 420, a character inputting means 430, a character predicting means 440, and a recognition zone setting means 450. The input signal receiving means 410 is configured to receive an input signal responsive to a user interaction with the virtual keyboard. The character determining means 420 is configured to determine a character according to one or more recognition zones selected based on the input signal. The character inputting means 430 is configured to input the determined character. The character predicting means 440, e.g., processor, is configured to predict characters most likely to be a next input character according to the input character. The recognition zone adjusting means 450 is configure to dynamically adjust the sizes of recognition zones of the current predicted characters and the last predicted characters independently of display zones, wherein the adjusted recognition zones of the current predicted characters are larger than their respective original sizes.

Preferably, the character determining means 420 may be further configured to determine the character according to the priorities of the predicted characters.

Preferably, the character determining means 420 may be further configured to determine the character according to weights generated based on the coordinate and the priorities.

Preferably, the character determining means 420 may further include a distance computing means, a nonlinear normalization computing means, a weight generating means, and a character selecting means. The distance computing means may be configured to compute distances from the coordinate of the input signal to a center of each recognition zone encompassing the coordinate. The nonlinear normalization computing means may be configured to compute nonlinear normalization values of the distances. The weight generating means may be configured to generate the weights based on the nonlinear normalization values of the distances and the priorities. The character selecting means may be configured to select the character according to the weights.

Preferably, the character selecting means may further include a probability value computing means and a character choosing means. The probability value computing means may be configured to compute probability values for choosing the recognition zones where the coordinate of the input signal is located based on the weights. The character choosing means may be configured to choose the character based on the probability values.

Preferably, the recognition zone setting means 450 may be further configured to adjust the sizes of the recognition zones of the current predicted characters to be different according to priorities of the current predicted characters.

Preferably, the recognition zone setting means 450 may be further configured to adjust sizes of recognition zones of characters adjacent to the current predicted characters to be smaller than their original sizes to avoid overlapping with the recognition zone of any other character on the virtual keyboard. However, the display zones of the adjacent characters may remain unchanged.

Preferably, there may be no current predicted character when the input character is the character "Space," "Enter" or "Backspace."

Preferably, the input system 400 may further include an input end signal receiving means for receiving an input end signal. The recognition zone setting means 450 may be further configured to restore the adjusted recognition zones to their original sizes responsive to the input end signal.

Preferably, the character predicting means 440 may be configured to predict the characters most likely to be the user-intended next input character based on a query to a database, wherein the database includes dictionary data and association rule data.

Those ordinary skilled persons in the art will understand the specific structures and functions of the input system 400 by referring to FIGS. 1-5 and related description about the embodiments of the input method 100 for the virtual keyboard. For simplicity, a detail description about the input system 400 is omitted.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of recognizing user input through interaction with a graphical user interface (GUI), the method comprising:

rendering a GUI for display on a display device, wherein the GUI comprises a virtual keyboard comprising a plurality of characters arranged in a layout, wherein each character is associated with a recognition zone, wherein a user interaction detected within a recognition zone causes an associated character to be selected as an input character;

receiving a first user interaction with the GUI on a first location within the virtual keyboard;

selecting a first character as a first input character, wherein the first character is associated with a first recognition zone encompassing the first location, wherein the first location is encompassed by an overlap zone of a plurality of recognition zones comprising the first recognition zone;

computing distances from the first location to respective centers of the plurality of recognition zones;

computing nonlinear normalization values of the distances; and determining weights based on the nonlinear normalization values of the distances, wherein the first character is selected based on the weights;

automatically predicting one or more next characters based on the first input character; and adjusting recognition zones of the one or more next characters based on the predicting.

2. The computer implemented method according to claim 1 further comprising determining priorities of respective characters associated with the plurality of recognition zones based on data related to vocabulary, and wherein the selecting the first character is further based on priorities of the plurality of recognition zones.

3. The computer implemented method according to claim 2,
wherein the weights are determined further based on the priorities with reference to the respective characters.

4. The computer implemented method according to claim 1, wherein display sizes of the one or more next characters remain unchanged during the adjusting the recognition zones thereof.

5. The computer implemented method according to claim 1, wherein the selecting the first character further comprises computing probability values for choosing the recognition zones encompassing the first location based on the weights, wherein further the first character s selected based on the probability values.

6. The computer implemented method according to claim 2, wherein the adjusting the recognition zones further comprises enlarging the recognition zones of the one or more next characters based on the priorities of characters associated with the recognition zones.

7. The computer implemented method according to claim 1 further comprising decreasing recognition zones of adjacent characters that are adjacent to the one or more next characters, wherein the recognition zones of the adjacent characters do not overlap with the recognition zones of the one or more next characters.

8. The computer implemented method according to claim 1 further comprising:
receiving a second user interaction with the GUI on a second location within the virtual keyboard; and
selecting a "Space" character as a second input character without predicting a next character.

9. The computer implemented method according to claim 1 further comprising:
receiving a second user interaction with the virtual keyboard; and
restoring the recognition zone of each character to an original size thereof.

10. The computer implemented method according to claim 1, wherein the predicting the one or more next characters comprises sending a query to a database, wherein the database comprises dictionary data and association rule data.

11. A system comprising:
a display device;
a processor coupled to the display device; and
memory coupled to said processor and comprising instructions that, when executed by said processor, cause the system to perform a method of receiving user input, the method comprising:
rendering a graphical user interface (GUI) for display on a display device, wherein the GUI comprises a virtual keyboard comprising a plurality of characters arranged in a layout, wherein each character is associated with a recognition zone, wherein a user interaction detected within the recognition zone causes the character to be selected as an input character;
receiving a first user interaction with the GUI on a first location within the virtual keyboard;
selecting a first character as a first input character, wherein the first character is associated with a first recognition zone encompassing the first location, wherein the first location is encompassed by an overlap zone of a plurality of recognition zones comprising the first recognition zone;
computing distances from the first location to respective centers of the plurality of recognition zones;
computing nonlinear normalization values of the distances; and
deriving weights based on the nonlinear normalization values of the distances, wherein the first character is selected further based on the weights;
automatically predicting one or more next characters based on the first input character; and
adjusting recognition zones of the one or more next characters based on the predicting.

12. The system according to claim 11, wherein said method further comprising determining priorities of respective characters associated with the plurality of recognition zones based on statistics data related to vocabulary, wherein the selecting the first character further comprises selecting the first character based on priorities of the plurality of recognition zones.

13. The system according to claim 11, wherein display zones of the one or more next characters remain unchanged during the adjusting the recognition zones thereof.

14. The system according to claim 11, wherein the selecting the first character further comprises computing probability values for choosing the recognition zones encompassing the first location based on the weights, wherein the first character is selected further based on the probability values.

15. The system according to claim 14, wherein the adjusting the recognition zones further comprises enlarging the recognition zones of the one or more next characters based on the priorities of characters associated with the recognition zones.

16. The system according to claim 11, wherein the method further comprises decreasing recognition zones of adjacent characters that are adjacent to the one or more next characters, wherein the recognition zones of the adjacent characters do not overlap with the recognition zones of the one or more next characters.

17. The system according to claim 11, wherein the method further comprises:
  receiving a second user interaction with the GUI on a second location within the virtual keyboard; and
  selecting a "Space" character as a second input character without predicting a next character.

18. The system according to claim 11, wherein the method further comprises:
  receiving a second user interaction with the virtual keyboard; and
  restoring the recognition zone of each character to an original size thereof.

19. The system according to claim 11, wherein the predicting the one or more next characters comprises sending a query to a database, wherein the database comprises dictionary data and association rule data.

* * * * *